(12) United States Patent
Takada et al.

(10) Patent No.: US 11,949,325 B2
(45) Date of Patent: Apr. 2, 2024

(54) POWER CONVERSION DEVICE

(71) Applicant: SANKEN ELECTRIC CO., LTD., Niiza (JP)

(72) Inventors: Junichi Takada, Niiza (JP); Toshihiro Nakano, Niiza (JP)

(73) Assignee: SANKEN ELECTRIC CO., LTD., Niiza (JP)

( * ) Notice: Subject to any disclaimer, the term of this patent is extended or adjusted under 35 U.S.C. 154(b) by 231 days.

(21) Appl. No.: 17/704,053

(22) Filed: Mar. 25, 2022

(65) Prior Publication Data

US 2022/0216782 A1 Jul. 7, 2022

Related U.S. Application Data

(63) Continuation of application No. PCT/JP2019/038502, filed on Sep. 30, 2019.

(51) Int. Cl.
*H02M 1/32* (2007.01)
*H02M 3/158* (2006.01)

(52) U.S. Cl.
CPC ........... *H02M 1/327* (2021.05); *H02M 3/158* (2013.01)

(58) Field of Classification Search
CPC ............... H02M 1/327; H02M 3/158; G06F 1/266–1/3206; G06F 1/3212
See application file for complete search history.

(56) References Cited

U.S. PATENT DOCUMENTS 11,063,516 B1 * 7/2021 Kim .................... H02M 1/0006

2019/0006945 A1 * 1/2019 Takada .................... H02M 1/32
2019/0372461 A1 * 12/2019 Wang ..................... H02M 1/083
2021/0296981 A1 * 9/2021 Neudorf ............. H02M 1/0048

FOREIGN PATENT DOCUMENTS

| JP | 2005-166110 A | 6/2005 |
| JP | 2007-213923 A | 8/2007 |
| JP | 2019-13130 A | 1/2019 |

OTHER PUBLICATIONS

The International Search Report of PCT/JP2019/038502 dated Dec. 10, 2019.

* cited by examiner

*Primary Examiner* — Jue Zhang
*Assistant Examiner* — Lakaisha Jackson
(74) *Attorney, Agent, or Firm* — METROLEX IP LAW GROUP, PLLC

(57) ABSTRACT

A power conversion device according to an embodiment may include: an output circuit configured to perform a power conversion operation of converting input power into an output power and outputting the output power; and a microcomputer configured to control the power conversion operation by the output circuit with power supplied from an internal power source of the output circuit, wherein the microcomputer outputs a status signal notifying whether the microcomputer is in a power shutdown permit period or a power shutdown inhibit period, and the output circuit includes a power supply stop circuit configured, when receiving the operation stop signal that instructs to stop the power conversion operation, to stop the power supply from the internal power source to the microcomputer on a condition where the status signal indicates that the microcomputer is in the power shutdown permit period.

4 Claims, 8 Drawing Sheets

POWER CONVERSION DEVICE

CROSS REFERENCE TO RELATED APPLICATIONS

This application claims priority based on 35 USC 119 from prior International Patent Application No. PCT/JP2019/038502 filed on Sep. 30, 2019, the entire contents of which are incorporated herein by reference.

BACKGROUND

The disclosure may relate to a power conversion device equipped with an output circuit and a microcomputer that controls the output circuit.

A power conversion device is used in which a power supply chip, which functions as an output circuit, and a microcomputer chip, which functions as a microcomputer controlling the output circuit, are mounted on the same frame and packaged together. In such a power conversion device, an internal power source of the output circuit supplies power to the microcomputer. When a voltage of an input power supply drops or an abnormal or the like occurs, the output circuit stops the power supply to the microcomputer.

Upon stopping the power to the microcomputer, if the microcomputer is in the process of writing, the data may be corrupted. Therefore, the applicant has proposed a technology that outputs a stop signal from the output circuit to the microcomputer and then stops the internal power source when the microcomputer gets ready to be stopped (see, for example, Patent Document 1).

Patent Document 1: Japanese Patent Application
Publication No. 2019-013130

SUMMARY

However, in the technology described above, the output circuit outputs the stop signal to the microcomputer, and the microcomputer that has received the stop signal starts a stop process so as to output a stop permission signal to the output circuit to permit the stop. Therefore, two control lines for stopping the power supply may be required between the output circuit and the microcomputer, and also the output circuit may not be able to immediately stop the power supply even when the microcomputer is ready to be stopped.

An object of an embodiment of the disclosure may be to provide a power conversion device capable of simplifying a control line for stopping power supply between an output circuit and a microcomputer and capable of immediately stopping the power supply by the output circuit in a state where the microcomputer is ready to be stopped.

An aspect of the disclosure may be a power conversion device that may include: an output circuit configured to perform a power conversion operation of converting input power into a predetermined output power and outputting the output power; and a microcomputer configured to be supplied with power from an internal power source of the output circuit and control the power conversion operation by the output circuit, wherein the microcomputer is configured to output to the output circuit a status signal that notifies whether the microcomputer is in a power shutdown permit period in which the power supply to the microcomputer is permitted to be stopped or in a power shutdown inhibit period in which the power supply to the microcomputer is not permitted to be stopped, and the output circuit includes a power supply stop circuit configured, when receiving the operation stop signal that instructs to stop the power conversion operation, to stop the power supply from the internal power source to the microcomputer on a condition where the status signal indicates that the microcomputer is in the power shutdown permit period.

According to the above aspect, a control line for stopping the power supply can be simplified to one line that notifies the status signal from the microcomputer to the output circuit. Also, since the status signal notifies if the microcomputer is in the power shutdown permit period, the output circuit can immediately stop the power supply to the microcomputer when the microcomputer is in the state where the microcomputer is ready to be stopped.

DETAILED DESCRIPTION

Figure 1:
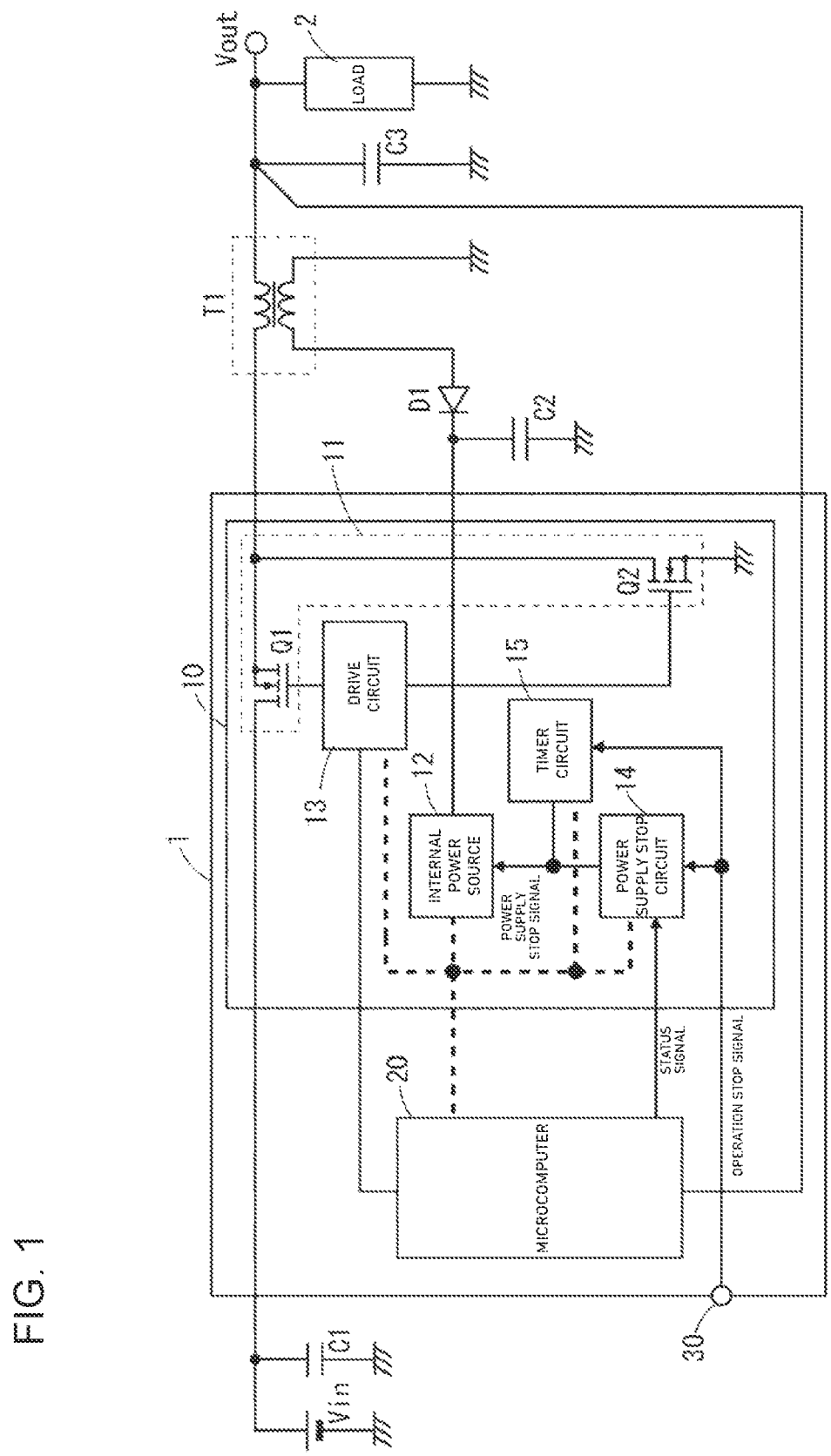
FIG. 1 is a diagram illustrating a circuit configuration of a power conversion device according to a first embodiment.

One or more embodiments are explained with referring to drawings. In the respective drawings referenced herein, the same constituents are designated by the same reference numerals and duplicate explanation concerning the same constituents may be omitted. All of the drawings are provided to illustrate the respective examples only. No dimensional proportions in the drawings shall impose a restriction on the one or more embodiments. For this reason, specific dimensions and the like should be interpreted with the following descriptions taken into consideration. In addition, the drawings include parts whose dimensional relationship and ratios are different from one drawing to another.

First Embodiment

Referring to FIG. 1, a power conversion device 1 (or a power converter) according to a first embodiment is a DC/DC converter that is configured to convert an input voltage Vin to an output voltage Vout and output the output voltage Vout. The power conversion device 1 is packaged with a chip-formed output circuit 10 and a chip formed microcomputer 20 mounted on a same frame.

The output circuit 10 includes a switching device Q1 and a switching device Q2, which function as output parts 11, an internal power source 12, a drive circuit 13, a power supply stop circuit 14, and a timer circuit 15. Note that the switching device Q1 and the switching device Q2 can be configured as a chip(s) or the like independent from the output circuit 10 and connected to the outside of the output circuit 10.

An input capacitor C1 is connected to both ends of the input voltage Vin, the positive side of the input voltage Vin is connected to a drain of the switching device Q1, and the negative side of the input voltage Vin is grounded. A source of the switching device Q1 is connected to a drain of the switching device Q2 and to one end of a primary winding of a transformer T1. The other end of the primary winding of the transformer T1 is connected to one end of an output capacitor C3, and the other end of the output capacitor C3 is grounded. A load 2 is connected to both ends of the output capacitor C3.

One end of a secondary winding of the transformer T1 is connected to an anode of a diode D1, and the other end of the secondary winding of the transformer T1 is grounded. A cathode of the diode D1 is connected to an input of the internal power source 12 and to one end of the capacitor C2. The other end of the capacitor C2 is grounded. As a result, the switching output stepped down by the transformer T1 is rectified by the diode D1 and then smoothed by the capacitor C2 to generate a DC voltage, which is input to the internal power source 12.

As illustrated by the bold dotted lines in FIG. 1, an output of the internal power source 12 is connected to and supplies power to the drive circuit 13, the power supply stop circuit 14, and the timer circuit 15 in the output circuit 10, and the microcomputer 20.

The drive circuit 13 outputs a Q1 drive signal to a gate of the switching device Q1, and drives the switching device Q1 by the Q1 drive signal. The drive circuit 13 outputs a Q2 drive signal, which has a reverse phase of the Q1 drive signal, to the gate of the switching device Q2, and drives the switching device Q2 by the Q2 drive signal.

The microcomputer 20 detects the voltage between both ends of the output capacitor C3 as the output voltage Vout, and outputs control signals to the drive circuit 13 to control duty ratios of the Q1 drive signal and the Q2 drive signal so that the output voltage Vout becomes constant.

The output circuit 10 is provided with an external input terminal 30 that accepts input of an operation stop signal, from an external source, such as a host system, to instruct the power conversion device 1 to stop operating. The operation stop signal is input via the external input terminal 30 to the power supply stop circuit 14 and the timer circuit 15. The operation stop signal, for example, is normally at a Hi level, and a transition of the operation stop signal from the Hi level to a Low level instructs to stop the operation of the power conversion device 1.

The microcomputer 20 outputs a status signal to the output circuit 10 to notify a status of the microcomputer 20. The status signal is used to notify whether the microcomputer 20 is in a power shutdown permit period during which the power supply is permitted to be stopped, or in a power shutdown inhibit period during which the power supply is not permitted to be stopped, such as during writing to the memory. The status signal, for example, is at a Low level during the power shutdown permit period. A transition of the status signal from the Low level to a Hi level notifies the start of the power shutdown inhibit period.

The status signal output from the microcomputer 20 is input to the power supply stop circuit 14. When the power supply stop circuit 14 is instructed to stop the operation of the power conversion device 1 by the operation stop signal on the condition that the microcomputer 20 is in the power shutdown permit period, the power supply stop circuit 14 outputs to the internal power source 12 a power supply stop signal that instructs the internal power source 12 to stop supplying power. In other words, when the power supply stop circuit 14 receives the operation stop signal at the Low level and the status signal at the Low level, the power supply stop circuit 14 outputs the power supply stop signal to the internal power source 12 that instructs the internal power source 12 to stop supplying power. The power supply stop signal, for example, is normally at a Hi level, and a transition of the power supply stop signal from the Hi level to the Low level instructs the internal power source 12 to stop supplying power.

Upon being instructed by the operation stop signal to stop the operation of the power conversion device 1, the timer circuit 15 starts counting the time for a preset waiting period $T_0$. When the waiting period $T_0$ elapses, the timer circuit 15 outputs the power supply stop signal that instructs the internal power source 12 to stop supplying power. Note that in a first embodiment, the power supply stop signal output from the power supply stop circuit 14 and the power supply stop signal output from the timer circuit 15 are common. Therefore, the transition from the Hi level to Low level in the power supply stop signal output from either of the power supply stop circuit 14 or the timer circuit 15 instructs the internal power source 12 to stop supplying power.

Figure 2:
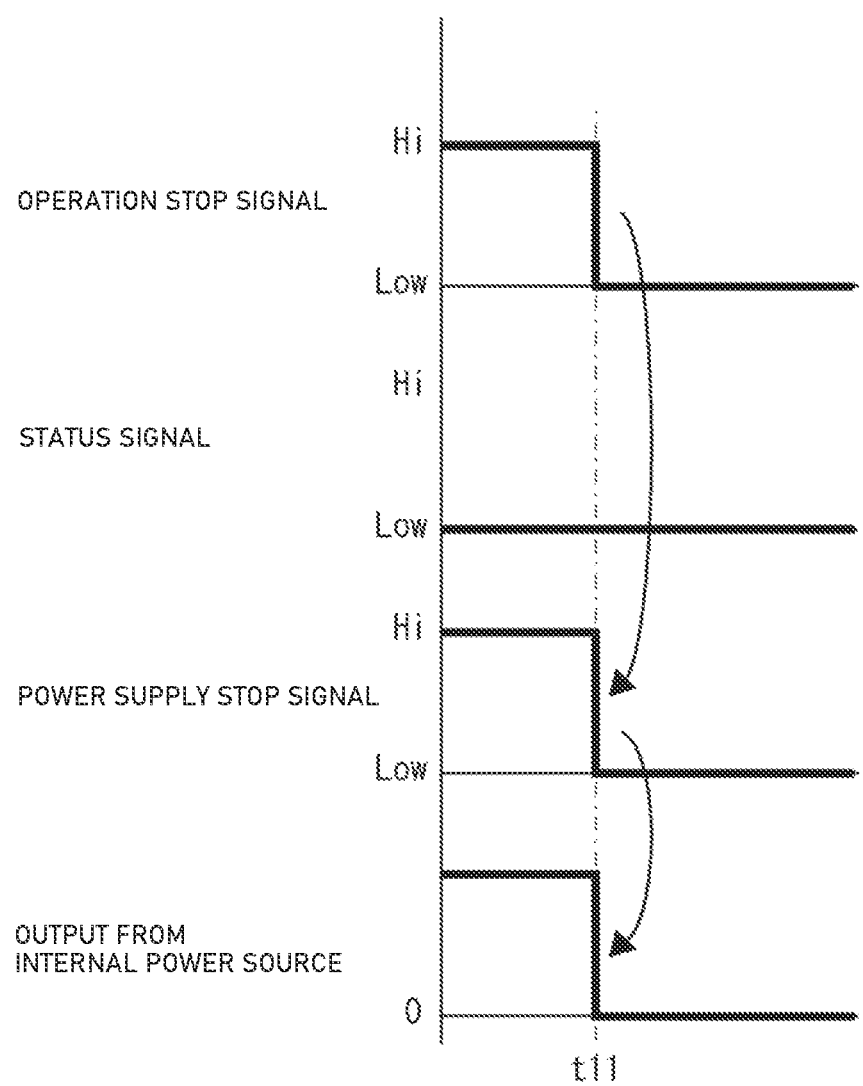
FIG. 2 is a timing chart illustrating operations of components of the power conversion device illustrated in FIG. 1.

Next, a power supply stop operation is explained in detail with reference to FIGS. 2 and 4. FIG. 2 illustrates an example where the status signal is at the Low level when the operation stop signal transition from the Hi level to the Low level at time t11. Referring to FIG. 2, at time t11, the operation stop signal input to the external input terminal 30 transitions from the Hi level to the Low level. With this, the power supply stop circuit 14 is instructed by the operation stop signal to stop the operation of the power conversion device 1, and thus the power supply stop circuit 14 checks the status signal output from the microcomputer 20. At this time, the status signal is in the Low level which indicates the microcomputer 20 is in the power shutdown permit period, and thus the power supply stop circuit 14 causes the power supply stop signal to transition from the Hi level to the Low level to instruct the internal power source 12 to stop supplying power. With this, the internal power source 12 can stop supplying power at a substantially same time when the operation stop signal instructs to stop the operation of the power conversion device 1.

Figure 3:
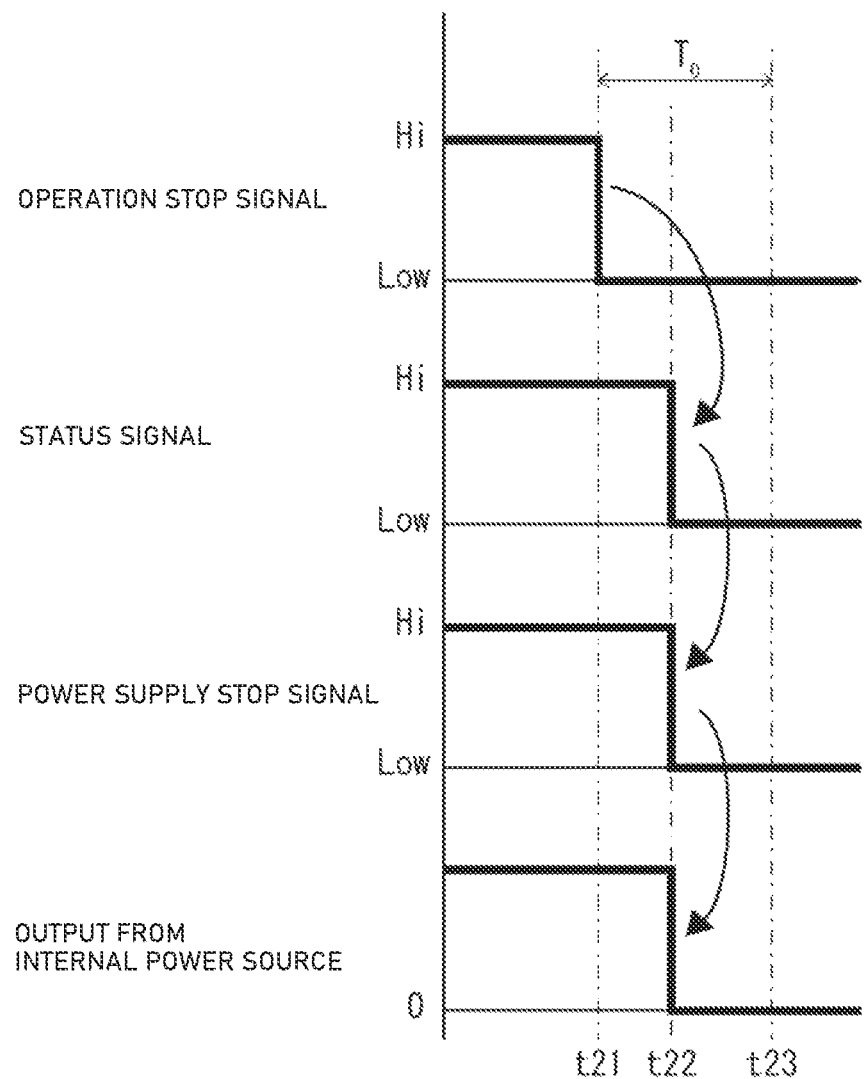
FIG. 3 is a timing chart illustrating operations of the components of the power conversion device illustrated in FIG. 1.

FIG. 3 illustrates an example where the status signal transitions from the Hi level to the Low level at time t22 after the operation stop signal instructs to stop the operation of the power conversion device 1 at time t21. Referring to FIG. 3, at time t21, the operation stop signal input to the external input terminal 30 transitions from the Hi level to the Low level to stop the operation of the power conversion device 1. Upon being instructed by the operation stop signal to stop the operation of the power conversion device 1, the power supply stop circuit 14 checks the status signal output from the microcomputer 20. At this time, the status signal is at the Hi level which indicates the microcomputer 20 is in the power shutdown inhibit period, and thus the power supply stop circuit 14 waits.

Also, upon being instructed by the operation stop signal to stop the operation of the power conversion device 1, the timer circuit 15 starts counting for the waiting period $T_0$. Then, at time t22, which is before time t23 when the waiting period $T_0$ elapses, the status signal transitions from the Hi level to the Low level which indicates the microcomputer 20 is in the power shutdown permit period. With this, the power supply stop circuit 14 causes the power supply stop signal to transition from the H level to the Low level to instruct the internal power source 12 to stop supplying power. This causes the internal power source 12 to stop supplying power at a substantially same time when the microcomputer 20 gets ready to be shutdown.

Figure 4:
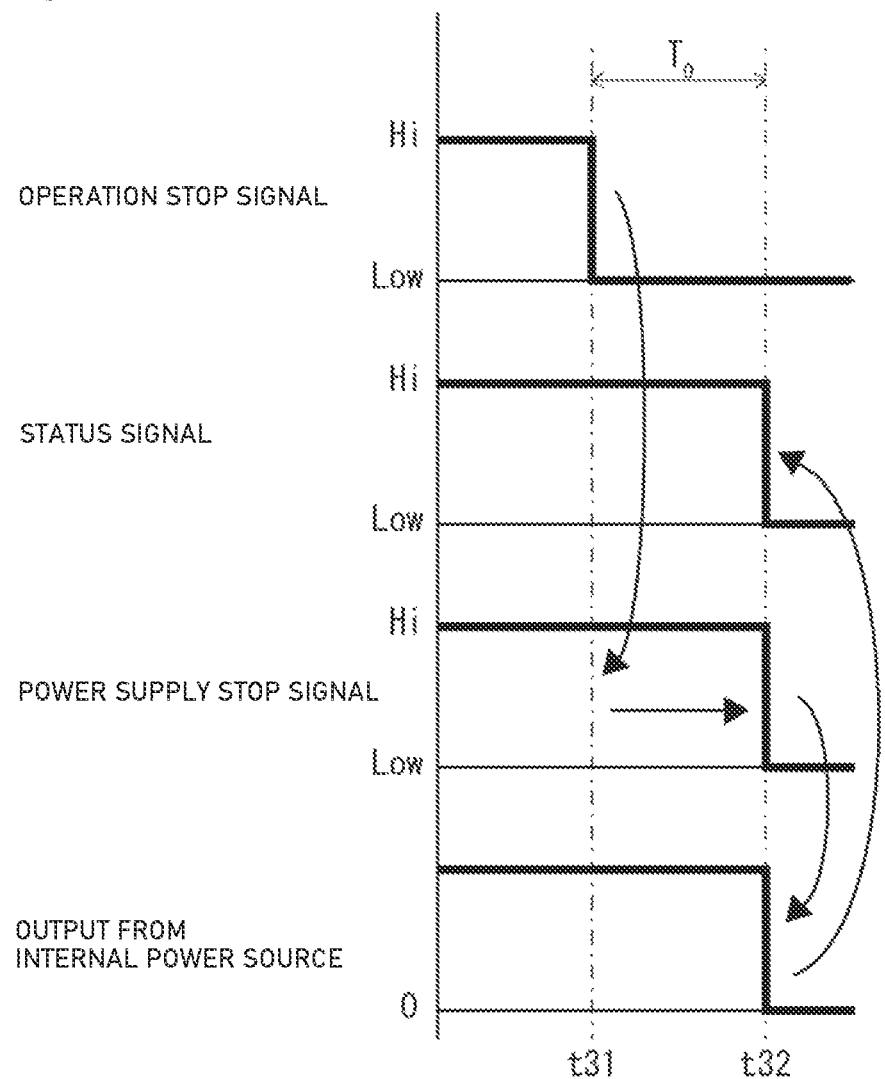
FIG. 4 is a timing chart illustrating operations of the components of the power conversion device illustrated in FIG. 1.

FIG. 4 illustrates an example where the status signal keeps at the Hi level until the waiting period $T_0$ elapses. Referring to FIG. 4, at time t31, the operation stop signal input to the external input terminal 30 transitions from the Hi level to the Low level to stop the operation of the power conversion device 1. Upon being instructed by the operation stop signal to stop the operation of the power conversion device 1, the power supply stop circuit 14 checks the status signal output from the microcomputer 20. At this time, the status signal is at the Hi level which indicates the microcomputer 20 is in the power shutdown inhibit period, and thus the power supply stop circuit 14 waits.

Also, upon being instructed by the operation stop signal to stop the operation of the power conversion device 1, the timer circuit 15 starts counting for the waiting period $T_0$. Then, at time t32 when the time elapses the waiting period $T_0$, the timer circuit 15 causes the power supply stop signal to transition from the Hi level to the Low level, so as to instruct the internal power source 12 to stop supplying power. This causes the internal power source 12 to stop supplying power according to the operation stop signal. Therefore, even if the status signal is somehow stuck in the Hi level which indicates that the microcomputer 20 is in the power shutdown inhibit period, it is possible to stop the power supply from the internal power source 12 based on the operation stop signal.

Second Embodiment

Figure 5:
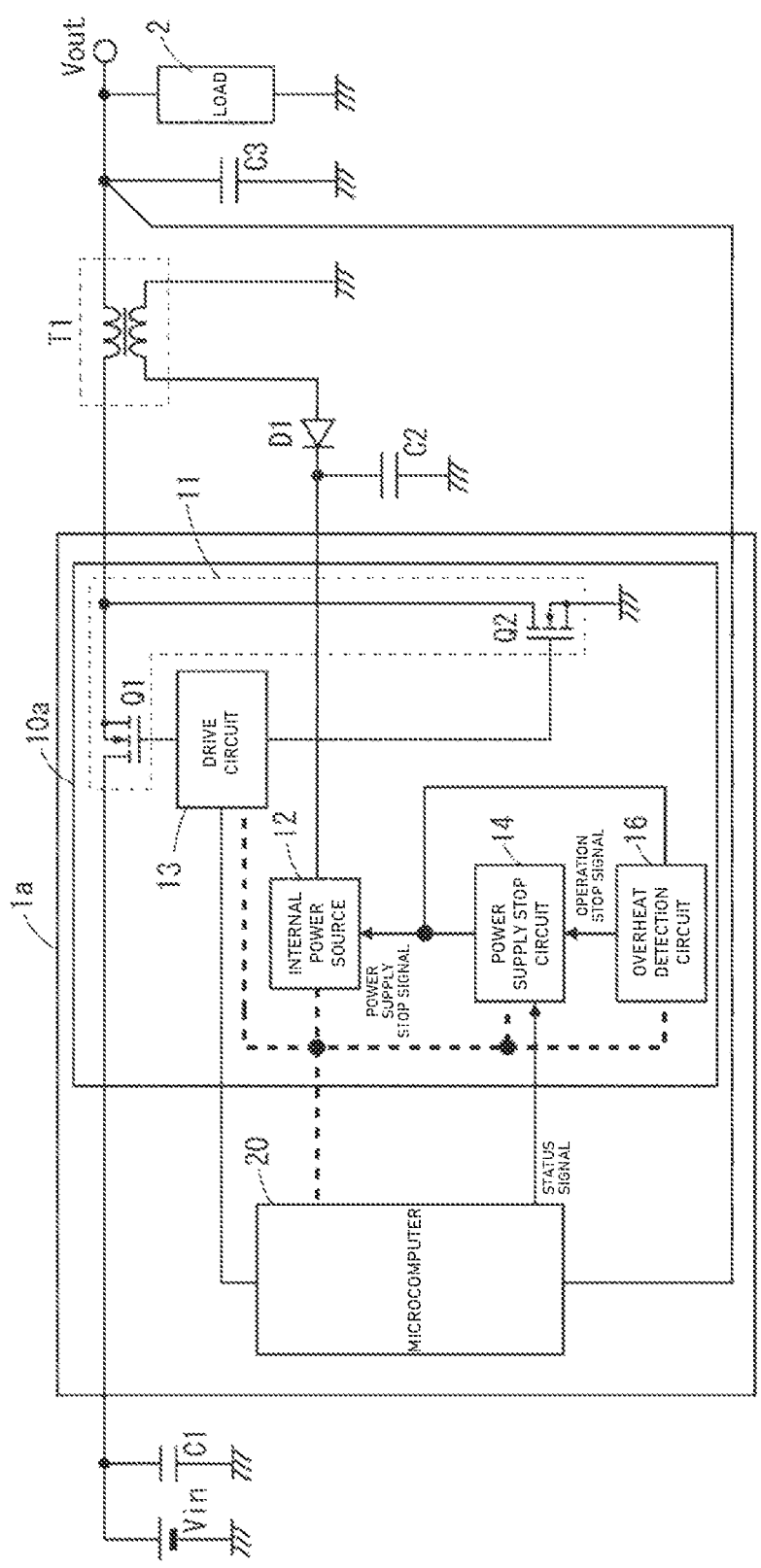
FIG. 5 is a circuit diagram illustrating a power conversion device according to a second embodiment.

FIG. 5 illustrates a power conversion device 1a according a second embodiment. Referring to FIG. 5, the power conversion device 1a according to a second embodiment includes an output circuit 10a with an overheat detection circuit 16 instead of the timer circuit 15 illustrated in FIG. 1. The output of the internal power source 12 is also connected to and supplies power to the overheat detection circuit 16, as illustrated by the bold dotted line in FIG. 5.

The overheat detection circuit 16 is laid out in the vicinity of the switching device Q1 and detects a junction temperature of the switching device Q1. When the detected junction temperature exceeds a predetermined first threshold temperature, the overheat detection circuit 16 outputs an operation stop signal to stop the operation of the power conversion device 1a to the power supply stop circuit 14. In other words, a second embodiment detects an operation stop factor in the power conversion device 1a to generate the operation stop signal.

Also, when the detected junction temperature exceeds a second threshold temperature, which is preset to be higher than the first threshold temperature, the overheat detection circuit 16 outputs to the internal power source 12 the power supply stop signal that instructs the internal power source 12 to stop supplying power. The power supply stop signal output from the power supply stop circuit 14 and the power supply stop signal output from the overheat detection circuit 16 are made common. Thus, the transition from the Hi level to the Low level in the power supply stop signal output from either of the power supply stop circuit 14 or the overheat detection circuit 16 instructs the internal power source 12 to stop supplying power.

Figure 6:
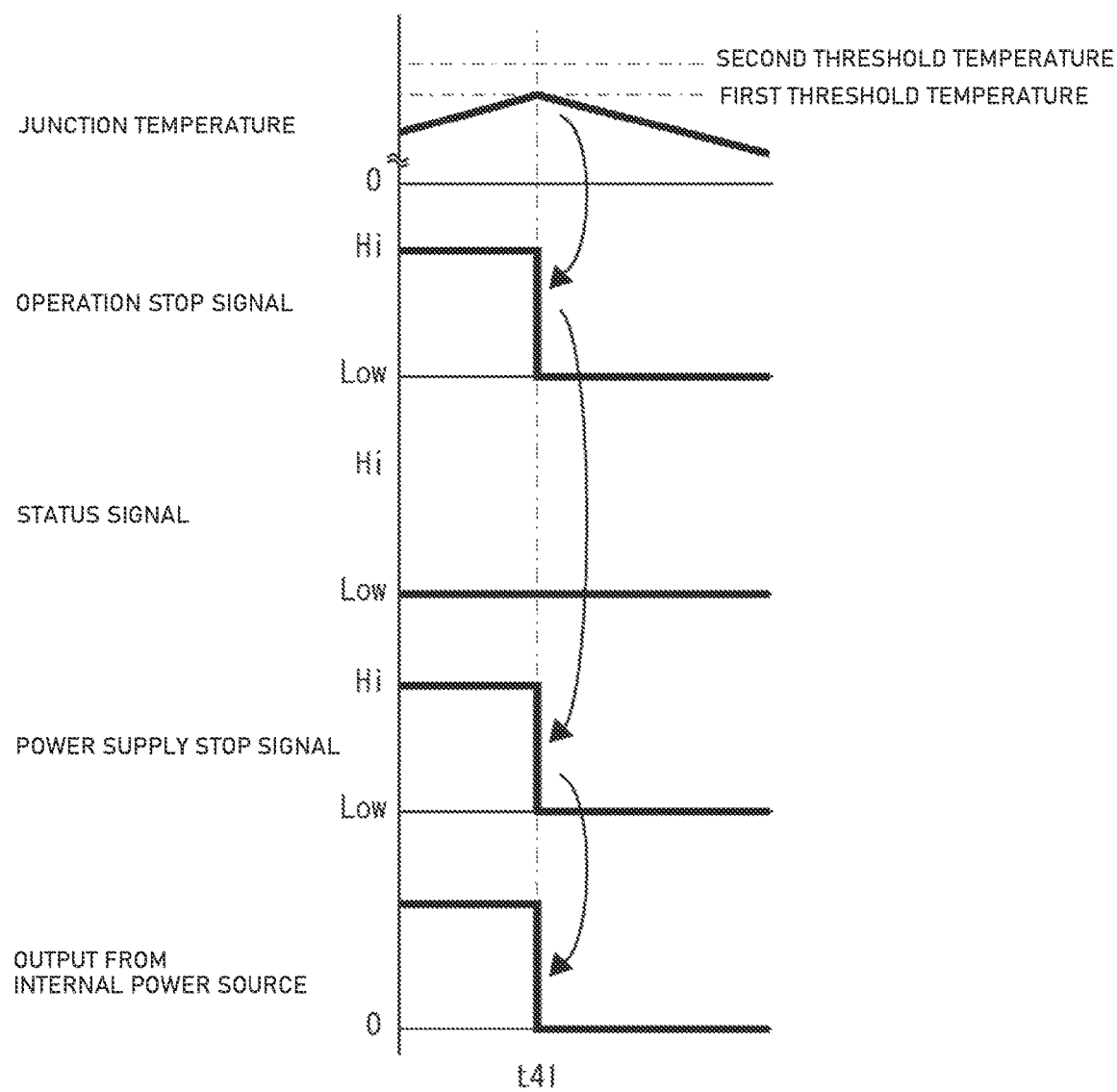
FIG. 6 is a timing chart illustrating operations of components of the power conversion device illustrated in FIG. 5.

Next, a power supply stop operation of the power conversion device 1a is explained in detail with reference to FIGS. 6 to 8. FIG. 6 illustrates an example where the status signal is in the Low level at time t41 when the junction temperature reaches the first threshold temperature. Referring to FIG. 6, due to an abnormality in a load 2, etc., the load current increases and the junction temperature of the switching device Q1 rises. When the junction temperature of the switching device Q1 exceeds the first threshold temperature at time t41, the overheat detection circuit 16 changes the operation stop signal from the Hi level to the Low level, so as to instruct to stop the operation of the power conversion device 1a. When instructed to stop the operation of the power conversion device 1a by the operation stop signal, the power supply stop circuit 14 checks the status signal output from the microcomputer 20. At this time, since the status signal is at the Low level indicating that the microcomputer is in the power shutdown permit period, the power supply stop circuit 14 causes the power supply stop signal to transition from the Hi level to the Low level, so as to instruct the internal power source 12 to stop supplying power. With this, the internal power source 12 stops supplying power at a substantially same time when the operation stop signal is output to stop the operation of the power conversion device 1a.

Figure 7:
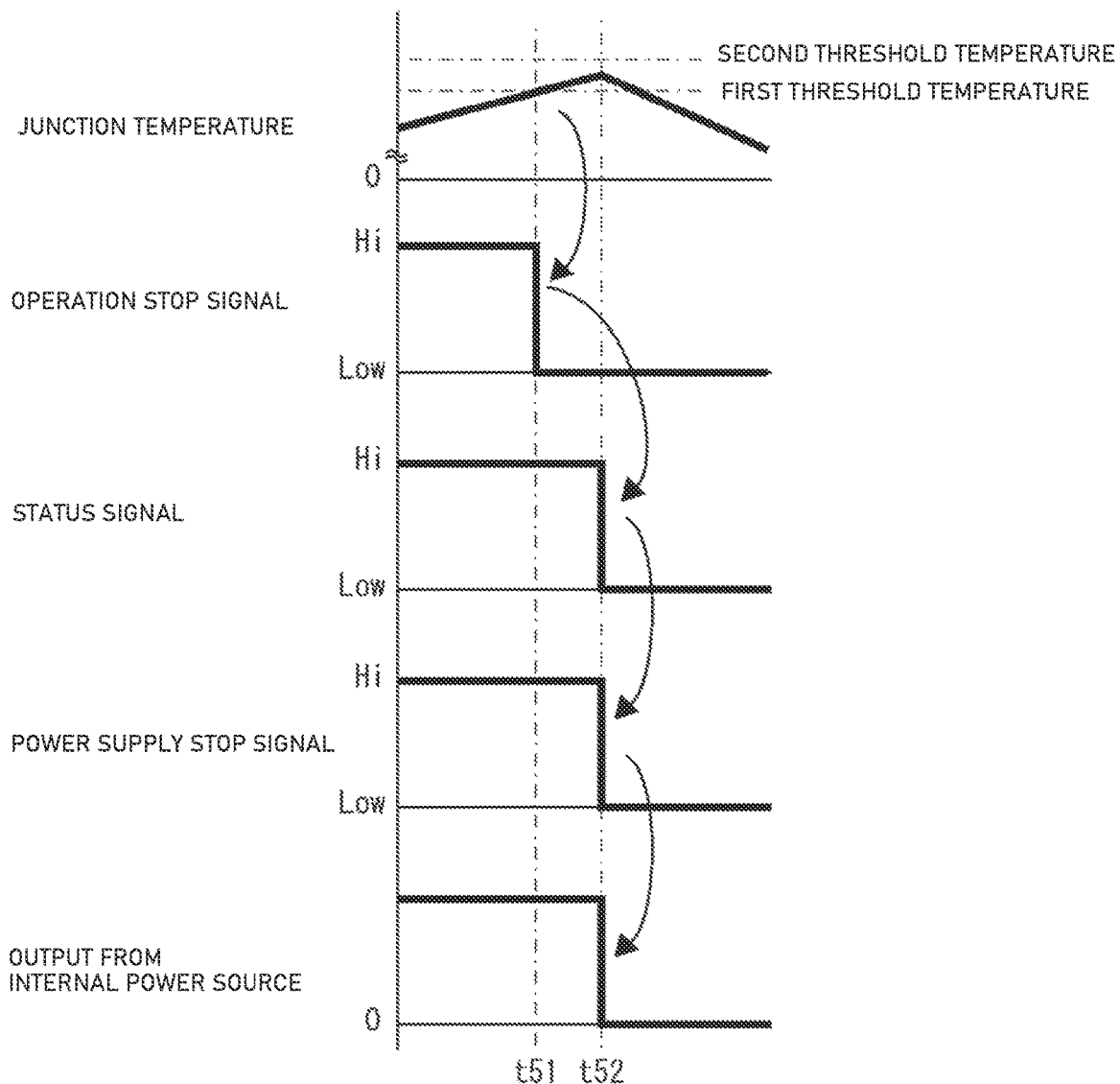
FIG. 7 is a timing chart illustrating operations of the components of the power conversion device illustrated in FIG. 5.

FIG. 7 illustrates an example where the status signal is in the Hi level at time t51 when the junction temperature reaches the first threshold temperature and then the status signal transitions from the Hi level to the Low level at time t52. Referring to FIG. 7, due to an abnormality in the load 2, etc., the load current increases and the junction temperature of the switching device Q1 rises. When the junction temperature of the switching device Q1 exceeds the first threshold temperature at time t51, the overheat detection circuit 16 causes the operation stop signal to transition from the Hi level to the Low level, to instruct to stop the operation of the power conversion device 1a. When instructed by the operation stop signal to stop the operation of the power conversion device 1a, the power supply stop circuit 14 checks the status signal output from the microcomputer 20. At this time, the status signal is in the Hi level indicating that the microcomputer is in the power shutdown inhibit period, and thus the power supply stop circuit 14 waits.

As a result, the operation of the switching device Q1 continues and the junction temperature of the switching device Q1 further rises. Then, at time t52 before the junction temperature exceeds the second threshold temperature, the state signal transitions from the Hi level to the Low level indicating that the microcomputer 20 is in the power shutdown permit period. With this, the power supply stop circuit 14 causes the power supply stop signal to transition from the Hi level to the Low level to instruct the internal power source 12 to stop supplying power. With this, the internal power source 12 stops supplying power at a substantially same time when the microcomputer 20 becomes ready to be shutdown.

Figure 8:
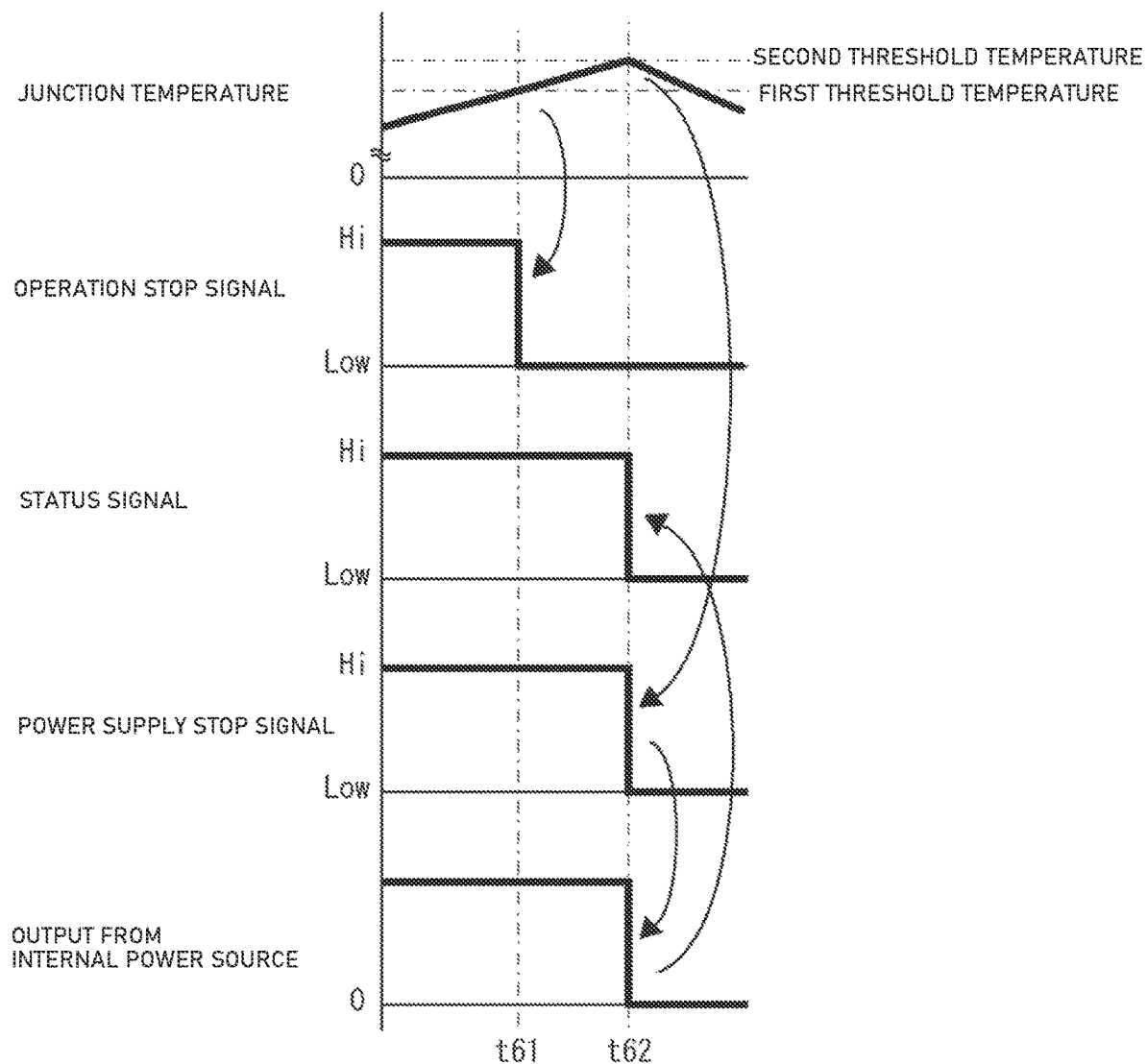
FIG. 8 is a timing chart illustrating operations of the components of the power conversion device illustrated in FIG. 5.

FIG. 8 illustrates an example where the status signal is in the Hi level at time t61 when the junction temperature reaches the first threshold temperature, and then the junction temperature reaches the second threshold temperature at time t62. Referring to FIG. 8, when due to an abnormality of the load 2, etc., the load current increases and the junction temperature of the switching device Q1 rises. When the junction temperature exceeds the first threshold temperature at time t61, the overheat detection circuit 16 changes the operation stop signal from the Hi level to the Low level, to instruct to stop the operation of the power conversion device 1a. When instructed by the operation stop signal to stop the operation of the power conversion device 1, the power supply stop circuit 14 checks the status signal output from the microcomputer 20. At this time, the status signal is in the Hi level indicating that the microcomputer is in the power shutdown inhibit period, and thus the power supply stop circuit 14 waits.

As a result, the operation of the switching device Q1 continues, and the junction temperature of the switching device Q1 further rises. Then, at time t62 when the junction temperature exceeds the second threshold temperature, the overheat detection circuit 16 changes the power supply stop signal from the Hi level to the Low level, to instruct the internal power source 12 to stop supplying power. With this, when the junction temperature exceeds a safety temperature, the power supply from the internal power source 12 can be stopped regardless of the state of the microcomputer 20 (e.g., even in the power shutdown inhibit period).

As explained above, according to one or more embodiments, the power conversion device 1 includes: the output circuit 10 that executes the power conversion operation of converting the input power into the predetermined output power and outputs the output power; and the microcomputer 20 that is supplied with power output from the internal power source 12 of the output circuit 10 and controls the power conversion operation by the output circuit 10, wherein the microcomputer 20 outputs the status signal to the output circuit 10 to notify whether it is in the power shutdown permit period or the power shutdown inhibit period, and the output circuit 10 includes the power supply stop circuit 14 that is configured, when receiving the operation stop signal that instructs to stop the power conversion operation, to stop the power supply from the internal power source 12 to the microcomputer 20 on the condition where it is confirmed that the status signal indicates that the microcomputer 20 is in the power shutdown permit period. This configuration simplifies the power shutdown control line to a single line that notifies the status signal from the microcomputer 20 to the output circuit 10. This configuration also allows the output circuit 10 to immediately stop the power supply when the microcomputer 20 is ready to stop, since the status signal continues to notify that the microcomputer is in the power shutdown permit period or not.

Furthermore, in one or more embodiments, the output circuit 10 includes the timer circuit 15 that is configured, when the operation stop signal is input, to start to count for the preset waiting period $T_0$, and configured, when the waiting period $T_0$ elapses, to stop supplying power from the internal power source 12 to the microcomputer 20, even if the status signal indicates that the microcomputer 20 is in the power shutdown inhibit period. With this configuration, the power supply from the internal power source 12 to the microcomputer 20 can be stopped based on the operation stop signal, even if the status signal is somehow stuck in a state (the Hi level) that indicates the microcomputer 20 is in the power shutdown inhibit period.

Furthermore, in one or more embodiments, the output circuit 10a includes the overheat detection circuit 16 configured to detect the junction temperature of the switching device Q1 that executes the power conversion operation by the switching operation, and, when the detected junction temperature exceeds the preset first threshold temperature, to output the operation stop signal to the power supply stop circuit 14. The overheat detection circuit 16 is further configured, when the detected junction temperature exceeds the preset second threshold temperature which is higher than the preset first threshold temperature, to cause the internal power source 12 to stop supplying power to the microcomputer 20 even if the status signal indicates that the microcomputer 20 is in the power shutdown inhibit period. With this configuration, the power supply from the internal power source 12 to the microcomputer 20 can be stopped when the junction temperature exceeds a safety temperature, regardless of the state of the microcomputer 20 (e.g., even during the power shutdown inhibit period).

The invention is not limited to one or more embodiments described above, and that each embodiment may be changed as appropriate within the scope of the technical concept of the invention. The number, position, shape, etc., of elements described above are not limited to one or more embodiments described above, and can be made into any number, position, shape, etc., that is suitable for implementing the invention. For example, the power conversion device 1 or 1a in the disclosure is not limited to a DC/DC converter and may be a DC/AC converter or AC/AC converter that outputs an AC voltage, as long as it is a power conversion device that converts input power into a predetermined output power. Note that in the respective drawings, the same constituents are designated by the same reference numerals and duplicate explanation concerning the same constituents is omitted.

The invention claimed is:

1. A power conversion device comprising:
   an output circuit configured to perform a power conversion operation of converting input power into a predetermined output power and outputting the output power; and
   a microcomputer configured to be supplied with power from an internal power source of the output circuit and control the power conversion operation by the output circuit, wherein
   the microcomputer is configured to output to the output circuit a status signal that notifies whether the microcomputer is in a power shutdown permit period in which the power supply to the microcomputer is permitted to be stopped or in a power shutdown inhibit period in which the power supply to the microcomputer is not permitted to be stopped, and
   the output circuit includes a power supply stop circuit configured, when receiving an operation stop signal that instructs to stop the power conversion operation, to stop the power supply from the internal power source to the microcomputer on a condition where the status signal indicates that the microcomputer is in the power shutdown permit period.

2. The power conversion device according to claim 1, wherein
   the output circuit includes a timer circuit configured, when receiving the operation stop signal, to start counting the time for a predetermined waiting period, and
   the timer circuit is configured, when the waiting period elapses, to stop supplying power from the internal power source to the microcomputer, even if the status signal indicates that the microcomputer is in the power shutdown inhibit period.

3. The power conversion device according to claim 1, wherein
   the output circuit includes an overheat detection circuit that is configured to detect a junction temperature of a switching device that performs switching operation to execute the power conversion operation and configured, when the detected junction temperature exceeds a predetermined first threshold temperature, to output the operation stop signal to the power supply stop circuit, and
   the overheat detection circuit is configured to stop the power supply from the internal power source to the microcomputer, when the junction temperature exceeds a predetermined second threshold temperature, which is set to be higher than the first threshold temperature, even if the status signal notifies that the microcomputer is in the power shutdown inhibit period.

4. The power conversion device according to claim 2, wherein the output circuit includes an overheat detection circuit that is configured to detect a junction temperature of a switching device that performs switching operation to execute the power conversion operation and configured, when the detected junction temperature exceeds a predetermined first threshold temperature, to output the operation stop signal to the power supply stop circuit, and the overheat detection circuit is configured to stop the power supply from the internal power source to the microcomputer, when the junction temperature exceeds a predetermined second threshold temperature, which is set to be higher than the first threshold temperature, even if the status signal notifies that the microcomputer is in the power shutdown inhibit period.

* * * * *